March 24, 1936.　　A. ARUTUNOFF　　2,034,790
PIPE LINE PUMP UNIT
Filed April 24, 1933　　2 Sheets-Sheet 1
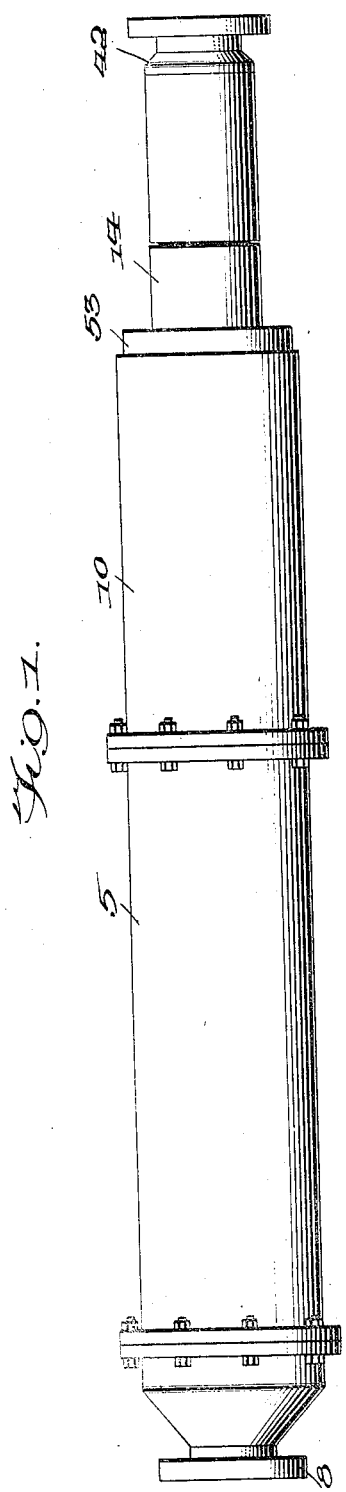
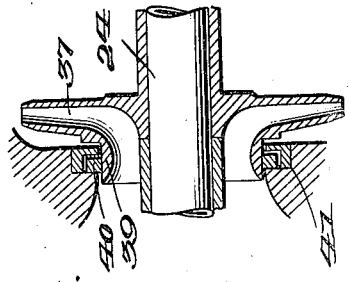
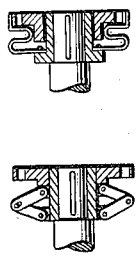
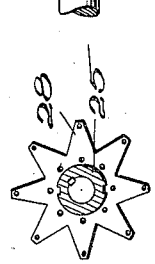
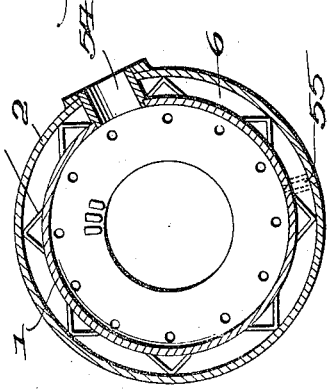
INVENTOR
A. Arutunoff,
BY
ATTORNEYS

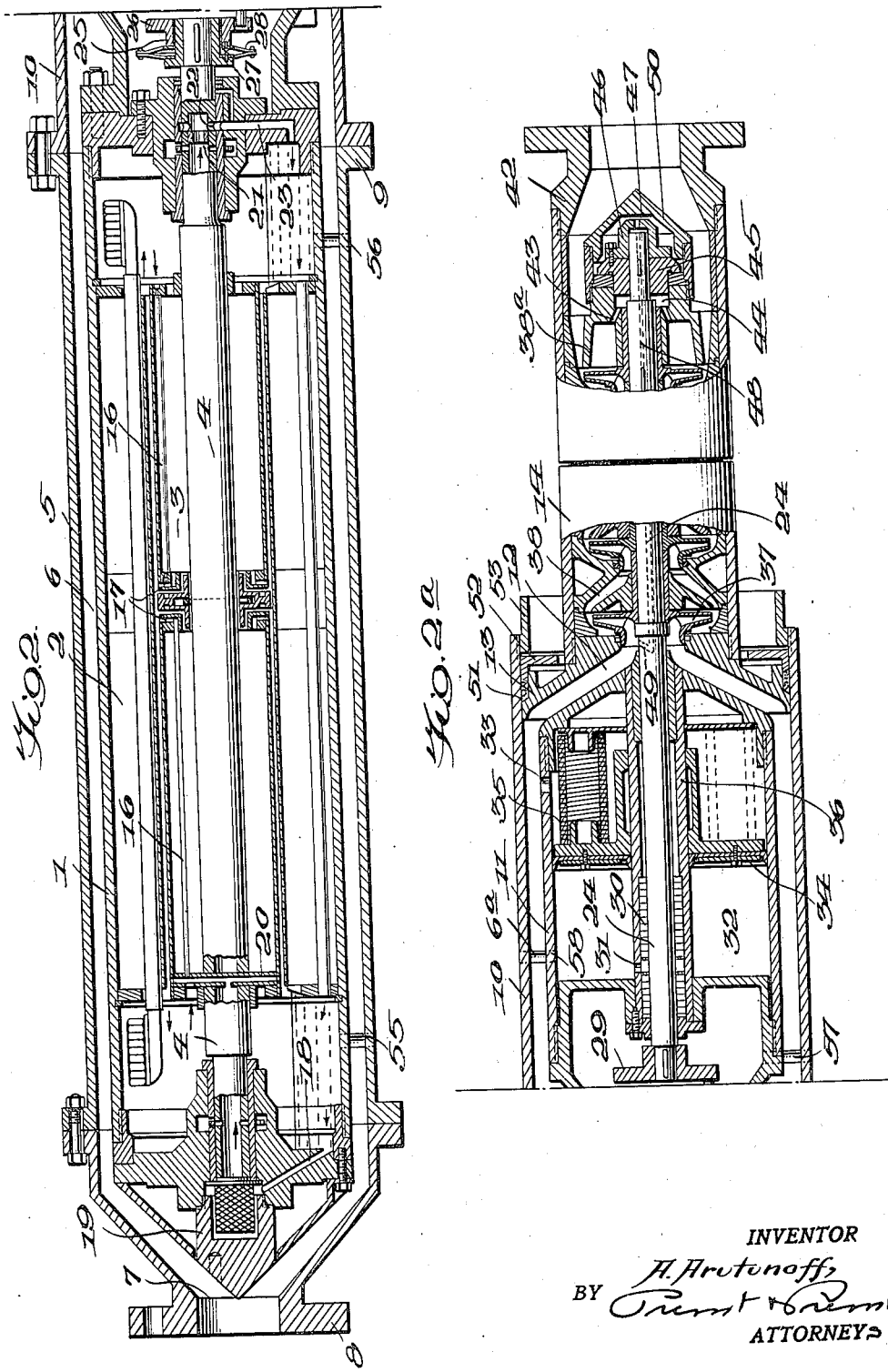

Patented Mar. 24, 1936

2,034,790

UNITED STATES PATENT OFFICE 2,034,790

PIPE LINE PUMP UNIT

Armais Arutunoff, Tulsa, Okla., assignor to Reda Pump Company, Bartlesville, Okla.

Application April 24, 1933, Serial No. 667,710

2 Claims. (Cl. 137—78)

My invention consists in new and useful improvements in electric motor driven pumps and is particularly adapted for use in connection with pipe lines, said motor being so constructed and arranged as to permit of its installation in and as a part of a horizontally extending pipe line, such for example as is employed in the transportation of oil and like products to remote points.

Heretofore the conventional pumps employed for forcing fluid through pipe lines of this character have been bulky complicated structures requiring permanent foundations and special buildings for housing the necessary machinery at every pumping station, and have necessitated constant supervision and service. This naturally involved a great expense not only in machinery and buildings but in the salaries of the personnel required to supervise and maintain the operation of such machinery, particularly in the oil industry where pipe lines often connect points thousands of miles apart and are laid straight across the country with a majority of stations located a great distance away from the centers of population.

It is the object of my invention to provide a compact and self-contained motor driven pipe line pump unit which will require neither shelter nor foundation and is adapted to be installed or interposed in a pipe line at any desired point simply as a piece of pipe forming a connecting link in the pipe line.

Another object is to provide a pump unit of sturdy and durable design and one which contains within itself all of the required lubrication, cooling and packing means, all of which function automatically, rendering it unnecessary to employ operators or supervisors and avoiding the necessity of service for years at a time.

A still further object of my invention resides in the improved construction of the motor, pump and coupling mechanism for the units in the pipe line.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views, Fig. 1 is a view in side elevation showing the complete motor and pump unit.

Figs. 2 and 2a are longitudinal sectional views showing the internal parts of the motor and pump unit.

Fig. 3 is a transverse sectional view showing the spacing and reinforcing means provided between the motor housing and the outer casing.

Fig. 4 is a plan view of one form of thrustless coupling for the pump and motor shafts.

Fig. 5 is a sectional view of a modified form of coupling member.

Fig. 6 is a further modification of a thrustless coupling, and

Fig. 7 is an enlarged sectional detail showing the wearing rings of the impellers of the centrifugal pump.

In the drawings, 1 represents a water-tight housing or casing for a horizontal electric motor which is cylindrical in cross section and preferably composed of standard tubular rolled stock or any suitable rigid material. Within the housing 1 is the electric motor comprising the conventional stator 2 and the rotor 3, the latter being mounted on the longitudinally extending horizontal hollow shaft 4 carried in suitable bearings hereinafter described. Surrounding the housing 1 and spaced apart therefrom is a cylindrical jacket 5, the annular space between the two forming a fluid passageway 6 converging at one end in a fluid inlet 7 at which point the jacket is provided with an intake flange 8 whereby the unit is connected into a pipe line. The opposite end of the jacket 5 is provided with a coupling flange 9 to facilitate its connection to a second jacket 10 surrounding a coupling and lubricating chamber 11, the space 6a between the jacket 10 and the housing of the coupling chamber, forming a continuation of the passageway 6 and terminating at the opposite end in a converging discharge outlet 12 which forms the intake opening in the base 13 of the pump unit 14.

The jacket 10 is preferably slidably mounted in connection with the base of the pump unit to provide for expansion and contraction as hereinafter set forth.

The jackets 5 and 10 are retained in spaced relation from the motor housing 1 and the housing of chamber 11 by a series of ribs 15 of rectangular cross section as shown in Fig. 3, said ribs being welded to the respective jackets and housings. This arrangement provides the necessary stiffness at a minimum weight of material employed and permits the construction of the shell and jacket from standard tubular and rolled stock, and, as will hereinafter appear, has the added advantage of greatly increasing the cooling surface of the motor.

In the motor unit, the rotor or rotors 3 are provided with longitudinally extending air channels 16 and ventilator vanes 17 carried by the hollow shaft 4. The motor housing 1, when in operation, contains a predetermined quantity of lubricating and cooling oil and in order to circulate this oil I provide a passage 18 in the end bearing support of the motor which leads to a chamber containing a filter screen 19 arranged co-axial of and adjacent the open end of the hollow shaft 4. 20 represents a vacuum pump carried by the shaft 4, said pump being adapted to operate with air on the principle of a centrifugal blower. Thus upon the rotation of the rotor, the lubricating and cooling oil is sucked through the passage 18 and filter screen 19 into the hollow shaft 4 under the priming effect of the vacuum pump 20 and is circulated through the entire length of the shaft from whence it is discharged through threshold opening 21 under the action of centrifugal force caused by the radially drilled holes 22 and through the return passage 23. Owing to the great diameter and the consequent great velocity of the rotor 3, the vacuum created is more than sufficient to lift the oil into the shaft 4 after which said oil is circulated under the centrifugal action of the drilled holes 22.

With the vacuum pump just described, the oil does not enter into the pump as the intake opening is located adjacent the center of the shaft, the oil being thrown on the outside walls of the shaft conduit, and as soon as the oil exceeds the thickness of the threshold opening 21, it is rapidly pumped out through the radial ports 22 which, although of smaller diameter than the vacuum pump, create a greater suction than the pump because of the fact that these radial holes are handling oil, while the pump conveys gases. In other words, the vacuum pump causes a suction through the inlet end of the shaft conduit and draws in gases and oil, while the drilled openings 22 at the other end of the shaft cause a centrifugal force for discharging and recirculating the oil passing through the shaft.

The motor shaft 4 is operatively connected to the pump shaft 24 by means of a coupling member 25, the latter comprising two telescoping sections 26 and 27 slidably engaging one another and being secured together by a torque transmitting spring element 28. The section 27 is keyed to the motor shaft 4 by any suitable means, while the section 26 is keyed or secured to the coupling flange 29 of the pump shaft 24. This type of coupling permits axial movement of the coupled shafts under load which is a very important feature for directly connected centrifugal pump units as it renders possible the use of hydraulic balancing discs instead of the now favored, other types of balanced impellers.

30 represents a series of packing rings arranged in a stuffing box around the pump shaft in a suitable bearing member, and in substantially the center of said stuffing box, I provide a radial opening 31 through which grease or heavy lubricant in the lubricating chamber 32 is supplied under the full pressure of the surrounding fluid in the passageway 6a through opening 33 in the casing 11 acting on a piston 34 located in the chamber 32, which pressure is supplemented by a series of springs 35 interposed between the piston 34 and one end of the chamber 32 in the casing 11. The piston 34 is slidably mounted in the chamber 32 on the longitudinally extending sleeve 36 which also forms a support for the packing rings 30.

The pump unit 14 comprises a series of impellers 37 fixed to the shaft 24 and adapted to co-act with a corresponding series of diffusers 38, said impellers being provided with annular shoulders 39 adapted to support loosely mounted wearing rings 40 adapted to rotate within an annular groove or recess in the retaining rings 41 carried by the diffusers as shown in detail in Fig. 7. The diffuser 38a located at the discharge end 42 of the pump unit is provided with drilled ports 43 for supplying pressure fluid to balance the axial thrust common to centrifugal pumps. This pressure fluid is forced into the chamber 44 under the hydraulic piston or disc 45 keyed on the pump shaft and secured co-axially to a head 46, the latter being provided with a co-axial opening or port 47 through which leakage fluid passes into the longitudinal passageway 48 in the pump shaft 24 and discharges adjacent the intake impeller of the pump through discharge opening 49.

The piston 45 and its cooperating parts, as before stated, are carried on the end of the pump shaft 24 and are enclosed by a housing 50 supported on the end diffuser 38a, the inner surface of the end of the housing immediately adjacent the head 46 being flat and serving as an abutment or valve head for controlling the passage of leakage fluid through the longitudinal port 47 into the shaft passageway 48, upon the relative axial movement of the shaft and connected parts.

At the union of the coupling housing 10 and the housing of the pump unit 14, I provide a packing member 51 which, with a gland ring 52 and threaded collar 53, is adapted to prevent leakage between the two housings, at the same time permitting a relative sliding movement of said housings to compensate for contraction and expansion of the pipe line.

On one side of the motor housing 1 and the outer casing 2, I provide registering openings which are connected by an annular sleeve 54 flanged and welded in place to accommodate electrical connections to the motor. I also provide similarly constructed drain openings 55 and 56 at the lower side of the motor for draining oil whenever required. 57 represents a drain opening for the coupling chamber 11, and 58 is an opening through the coupling chamber 11 and the surrounding casing 10 through which grease or other lubricant may be replenished in the chamber 32.

It will be apparent from the drawings and the foregoing description that owing to the combination of features embodied in my invention, a superior pump unit for pipe line work is provided. For example, compactness is assured by my arrangement for cooling the motor with the fluid being handled and passing through the passageway 6 surrounding the motor, while cooling of the motor from the inside is accomplished by circulating the lubricating oil through the motor shaft and connecting channels.

Rigidity of structure is provided by having all of the working parts housed within a strong steel jacket and obviously the simplicity of structure and installation is at a maximum by having both the inlet and outlet fluid openings or flanges arranged in a straight line or co-axial with the motor in the opposite ends of the unit, whereby the motor pump unit may be installed with no more difficulty than any other piece of pipe making up the pipe line.

This structure is far more reliable in operation than structures heretofore known because of the absence of complicated working parts employed in former structures and by reason of the grease or lubricating oil working as a sealing medium in the stuffing box, regardless of the kind of fluid pumped, and the embodiment in the structure of facilities for an ample reserve of grease or lubricant for years of service. The life of the stuffing box packing is further enhanced and frequent tightening common to ordinary stuffing boxes is rendered unnecessary by the use of the heavy springs 35 operating against the piston 34 to automatically compress the packing.

As the life of an electric motor depends upon the life of the insulation and of the wearing parts, namely, the bearings etc., it will be obvious that the design and structure of my improved motor unit will be decidedly effective to this end. The life of the insulation is prolonged and superior cooling afforded by the direct contact of the fluid passing around the motor and the oxidation effects are minimized on account of the limited amount of oxygen available inside of the totally enclosed motor, if it runs with air, or absolutely prevented if the motor is filled with some kind of inert gas. Wear on the bearings is reduced to a minimum by my arrangement for flooding the bearings with lubricating oil under pressure and by cooling the shaft from the inside, a very important feature when it is considered that the shaft forms the path of least resistance for all heat developed in the rotor. The majority of bearing failures may be attributed to inadequacy of cooling the bearings from the outside. As soon as the motor comes to speed, the circulation of oil starts through the action of the vacuum pump and the centrifugal force of the radial openings in the end of the shaft, said oil being forced under pressure into the bearings completely flooding them.

By providing the loose wearing rings on the impellers of the pump unit instead of the commonly used fixed rings, the life of the pump is greatly increased. Fixed wearing rings have the disadvantage in centrifugal pumps with horizontal shafts, that as the bearings wear, letting the shaft down, the fixed rings wear also, and thus cause increased loss of power and increased loss of pumped fluid. To prevent wear, fixed rings are made with considerable clearance around the impellers and for that reason, even when new, cause considerable leakage losses. On the other hand, loose wearing rings such as shown and described in connection with my improved structure have none of the above disadvantages. As they are free to follow the position of the impeller, downwear of the bearings does not cause either additional wear or additional leakage losses, and such rings can be made with a minimum clearance around the intake of the impeller.

From the foregoing it is believed that my invention may be readily understood by those skilled in the art without further description, it being borne in mind that numerous changes may be made in the details of structure, for example, instead of the torque preventing coupling shown in Fig. 4, I may employ devices such as illustrated in Figs. 5 and 6 and various other structural changes may be made without departing from the spirit of the invention as set out in the following claims.

What I claim and desire to secure by Letters Patent is:—

1. In combination with a liquid transporting pipe line, a motor and pump assembly interposed therein and forming a part thereof, said assembly comprising a motor section including an electric motor, a motor housing, a motor shaft, a jacket surrounding said housing and spaced apart therefrom to form an annular passageway, a pump section including a pump barrel, a pump shaft and a rotary pump driven thereby, an intermediate section including a coupling for operatively connecting the adjacent ends of said motor and pump shafts in co-axial alignment, a housing for said coupling, a jacket about said housing and spaced apart therefrom to form a passageway, means for connecting said sections in co-axial alignment, a stuffing box in said intermediate section embracing the adjacent end of said pump shaft, an annular grease chamber surrounding said stuffing box and in communication therewith, means for forcing grease under pressure from said chamber into said stuffing box, means for connecting said motor jacket with a section of pipe line with said annular passageway forming a continuation thereof, and means for coupling said pump barrel with the adjacent end of a section of pipe line so that said barrel forms a continuation of the latter.

2. In combination with a liquid transporting pipe line, a motor and pump assembly interposed therein and forming a part thereof, said assembly comprising a motor section including an electric motor, a motor housing, a motor shaft, a jacket surrounding said housing and spaced apart therefrom to form an annular passageway, a pump section including a pump barrel, a pump shaft and a rotary pump driven thereby, an intermediate section including a coupling for operatively connecting the adjacent ends of said motor and pump shafts in co-axial alignment, a housing for said coupling, a jacket about said housing and spaced apart therefrom to form a passageway, means for connecting said sections in co-axial alignment, at least one of said sections being slidably connected to the adjacent section to compensate for expansion and contraction in the pipe line, means for connecting said motor jacket with a section of pipe line with the annular passageway forming a continuation thereof, and means for coupling said pump barrel with the adjacent end of a section of pipe line so that said barrel forms a continuation of the latter.

ARMAIS ARUTUNOFF.